No. 875,942.　　　　　　　　　　　　　　　　　PATENTED JAN. 7, 1908.
S. M. MEYER.
ACETYLENE LAMP AND LIGHTING DEVICE FOR AUTOMOBILES AND OTHER VEHICLES.
APPLICATION FILED DEC. 21, 1905.
2 SHEETS—SHEET 1.
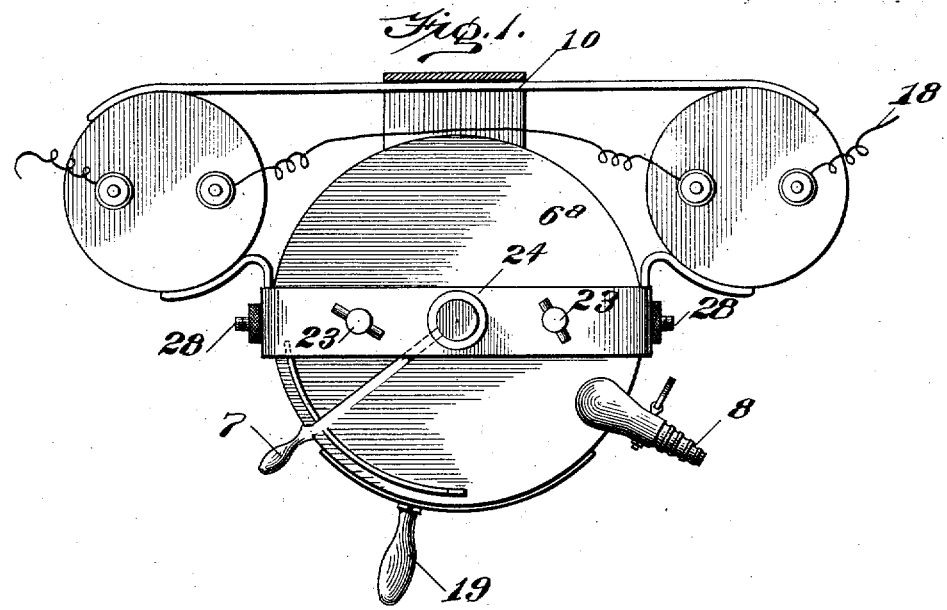
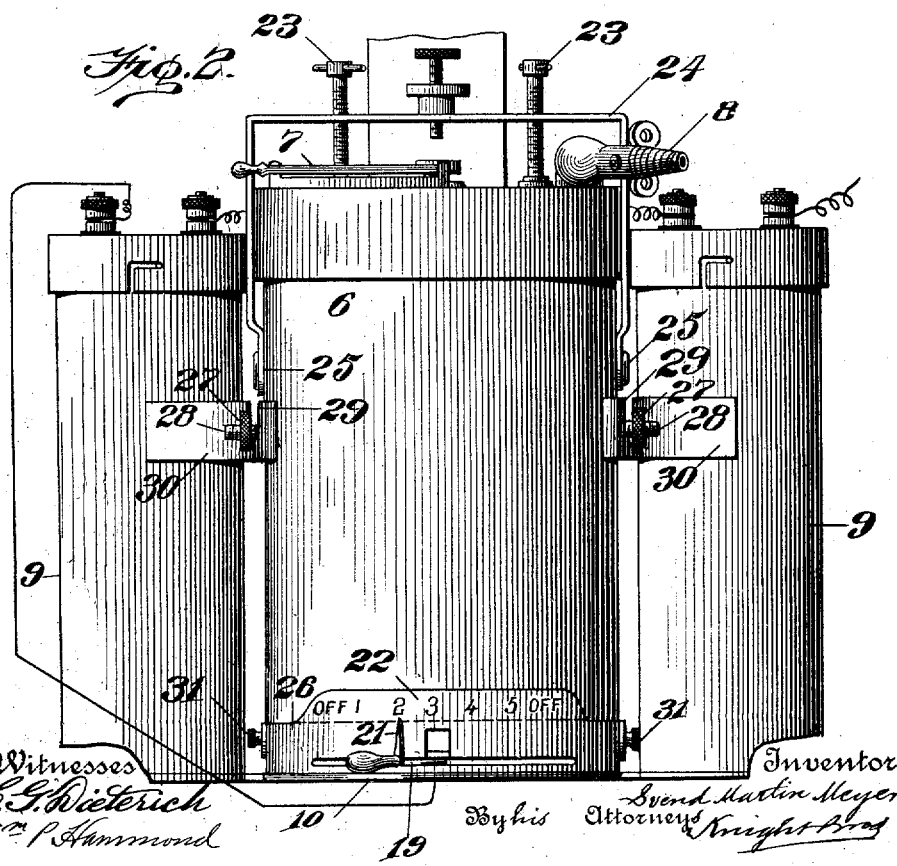
Witnesses
H. G. Dieterich
Wm. P. Hammond
Inventor
Svend Martin Meyer
By his Attorneys
Knight Bros.

No. 875,942. PATENTED JAN. 7, 1908.
S. M. MEYER.
ACETYLENE LAMP AND LIGHTING DEVICE FOR AUTOMOBILES AND OTHER VEHICLES.
APPLICATION FILED DEC. 21, 1905.
2 SHEETS—SHEET 2.
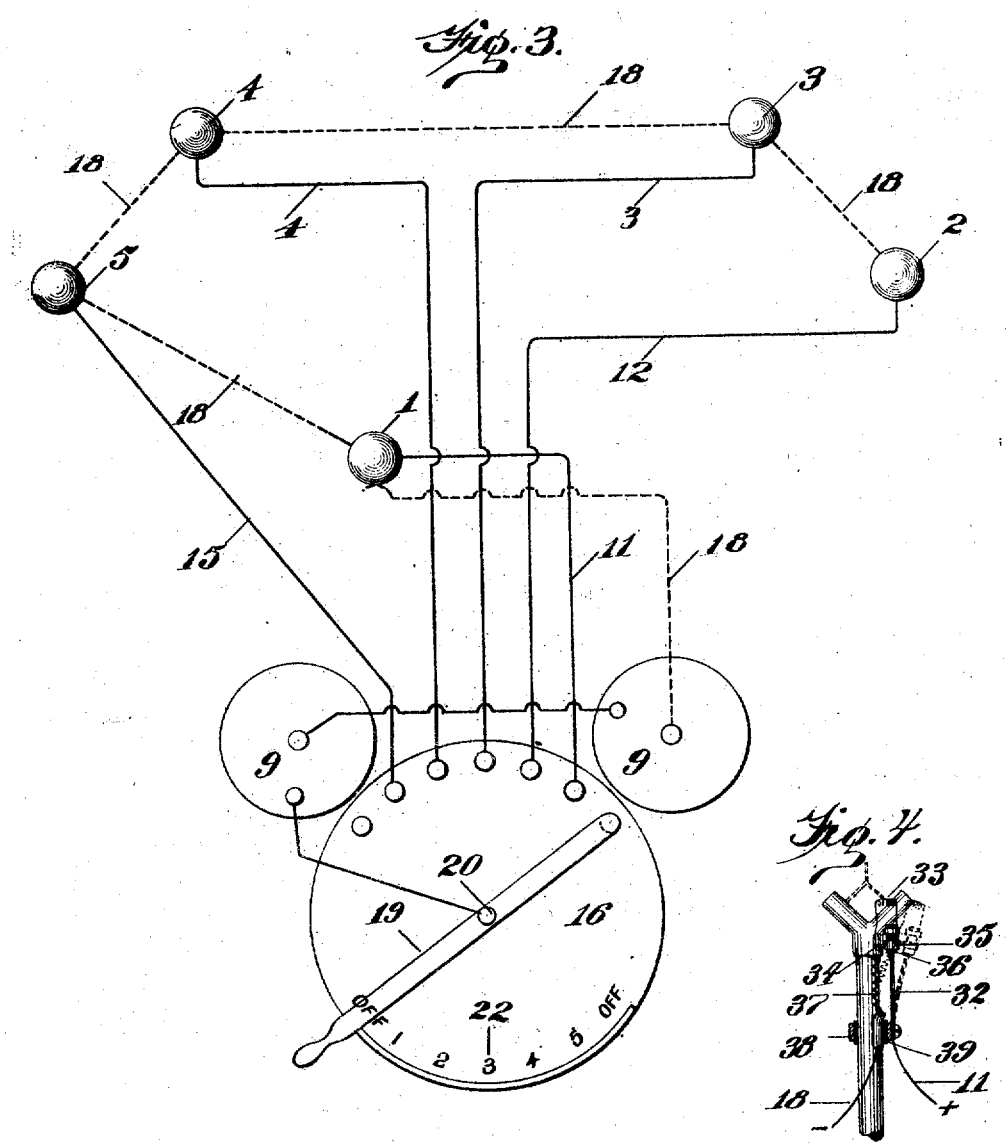
WITNESSES:
INVENTOR
Svend Martin Meyer
BY Knight Bros
Attorneys

UNITED STATES PATENT OFFICE.

SVEND MARTIN MEYER, OF NEW YORK, N. Y., ASSIGNOR TO GEORGE CLINTON BATCHELLER, OF NEW YORK, N. Y.

ACETYLENE LAMP AND LIGHTING DEVICE FOR AUTOMOBILES AND OTHER VEHICLES.

No. 875,942.    Specification of Letters Patent.    Patented Jan. 7, 1908.

Application filed December 21, 1905. Serial No. 292,852.

*To all whom it may concern:*

Be it known that I, SVEND MARTIN MEYER, a citizen of the United States, and resident of the borough of Brooklyn, in the city and State of New York, have invented a new and useful Improvement in Acetylene Lamps and Lighting Devices for Automobiles and other Vehicles, of which the following is a specification.

The subject of this invention is a novel combination of acetylene generator, electric batteries and switchboard and its accessories suitable for automobiles and other vehicles and enabling the operator, without leaving his seat, to instantly light or extinguish any one or all of the lamps on the machine.

The invention further relates to details in construction and arrangement of the switchboard, batteries and lamp - connections, means for mounting the generator removably in the frame and other details hereinafter specifically described and claimed.

In the accompanying drawings, Figure 1 is a plan view of the gas generating and self-lighting apparatus. Fig. 2 is a rear elevation of the same. Fig. 3 is a diagrammatic view omitting the generator, illustrating a relative arrangement of the switchboard, generator-bed, electric batteries, lamp-connections and lamps, suitable for an automobile. Fig. 4 is a detail elevation of one of the lamp burners showing the mode of removably mounting thereon an electric lighting coil adapted to be automatically deflected away from the flame by the heat of the latter, after lighting.

In Fig. 3; 1, 2, 3, 4 and 5 indicate the location of the several lamps as commonly arranged on an automobile.

In Fig. 1 and 2; 6 represents an acetylene generator, the details in construction of which need not be specifically described, as they form no part of my present invention. The valve lever for controlling the water feed and generation of gas, is shown at 7. 8 shows the gas-outlet from which in practice, connection is made by flexible and other tubes to the several lamps. 9 represents electric batteries for lighting the lamps, mounted together with the generator 6 in a connecting frame or bed 10. 11, 12, 13, 14, 15 indicate the several conducting wires controlled by a switchboard 16 for communicating electricity from one pole of the combined batteries to one end of an incandescent lighting coil 33 on each of the respective lamps, and 18 the return wires to the opposite pole of the batteries.

The switch-lever 19 swings on a center-pivot 20 and may have a movement of about 120° or less, as indicated in Fig. 3. It is provided with a pointer 21 working over an indicator - scale 22 numbered to correspond with the respective lamps and showing the position to which the lever must be set to light any of the lamps, by completing the electric circuit through their respective lighting coils. At either extremity of the movement of the lever, the current is cut off, as is indicated by the word "off" on the scale (Fig. 2).

To tightly secure the cover 6ª of the generator, and permit its ready removal for recharging with carbid and water, the said cover is held down by clamp-screws 23 threaded in a yoke 24 hinged at 25 to the body of the generator.

To enable the removal of the generator, for convenience in cleaning out refuse and recharging and for repairs or other purposes, the generator-cylinder is mounted in a bed 26 fixed in the frame 10, and is secured in position by clamp-nuts 27 working on screw-studs 28 projecting from the sides of the generator-cylinder which studs slip downward into open slots or notches 29 provided therefor in rigid brackets 30 projecting in suitable position from the respective battery-cylinders 9. Clamp screws 31 are further provided, threaded in the vertical rim or flange of the generator-bed 26 and these, when the generator is placed in position, are screwed in to tightly clamp its bottom part.

The mode of mounting the electric lighting coils on the several lamp-burners is illustrated in Fig. 4.

11 represents an insulated conducting wire from one pole of the battery (the positive for example) connected to a post 32 to one end of which the incandescing coil 33 is attached. The post 32 is made of two united plates of different metal of diverse expansibility by heat, so that heat from the flame after lighting causes deflection of the post 32 to a position such as indicated by dotted lines, carrying with it the coil 33 and removing the latter from contact or close proximity with the flame. The negative end of the coil 33 is mounted by a stud 34 on a collar 35 supported through an insulating bushing 36 on the upper end of the deflectable post 32 and connected by a flexible wire 37 with a clamp-collar 38 on which the bottom end of the post 32 is mounted through an insulating medium 39, so that the entire lighting coil and its mountings may be readily applied to and removed from the burner-tube.

18 represents the return wire connecting the collar 38 with the negative pole of the battery, so as to complete the circuit through the coil 33, when closed by the operation of the switch 19, as already described.

In operation; the switch lever 19 being in a normal position of rest—i. e., at either extremity of its movement;—if it be desired to light all the lamps, practically at once, the switch-lever is simply thrown from one end to the other of its movement, dwelling an instant on each number to give time for the respective lighting coils to become incandescent. If only one or more selected lamps are to be lighted the lever is moved quickly to the proper number (or numbers in succession) and as soon as the lighting is effected is thrown to the end of its stroke, the lamps on whose numbers the switch lever does not stop being unaffected by the movement.

Having thus described my invention, the following is what I claim as new therein and desire to secure by Letters Patent:

1. An acetylene lamp and self-lighting system for vehicles comprising an acetylene generator and an electric battery mounted together in a connecting frame; a series of suitably arranged lamps, conductors connecting from the battery to the several lamps and a switch closing the circuits through the several lamps for lighting selected lamps at the will of the operator, substantially as described.

2. The combination of an acetylene generator 6, a bed 26 on which it is removably mounted, electric batteries 9, 9, means for clamping the generator securely to the generator bed and battery cylinders, a series of suitably arranged lamps, conductors connecting the batteries with the several lamps and a switch closing the respective circuits through the several lamps; so as to light selected lamps, substantially as described.

3. The combination of an acetylene generator, a series of lamps supplied with gas therefrom, a generator bed, electric batteries and means for securely and removably mounting the generator cylinder on a supporting frame through the medium of the bed and batteries, electric conductors connecting the several lamps with the batteries, a switch on the generator frame adapted to close the several electric circuits through the respective lamps and an indicator for the switch marked to correspond with the several lamps to enable the lighting of selected lamps, substantially as described.

4. In an acetylene lamp for vehicles, the combination of an acetylene lamp-burner, an incandescing coil for igniting said burner, a thermally deflectable post on which said coil is mounted, means for supporting both ends of the incandescing coil on said post and insulating said ends one from the other, a clamp-collar by which the deflectable post and incandescing coil are removably mounted on the burner, a flexible electrical connection between said collar and one end of the incandescing coil insulated from the other end thereof, electrical connection from one pole of a source of electricity to said clamp-collar and thence to one end of the incandescing coil and electric connection from the opposite pole to the other end of said coil, substantially as described.

5. An acetylene lamp and self-lighting system for automobiles comprising an acetylene generator and an electric battery, a series of suitably arranged lamps, conductors connecting from the battery to the several lamps and a switch closing the circuits through the several lamps for lighting selected lamps at the will of the operator.

SVEND MARTIN MEYER.

Witnesses:
WILLIAM P. HAMMOND,
OCTAVIUS KNIGHT.